(12) United States Patent
Banister (10) Patent No.: US 9,150,792 B2
(45) Date of Patent: Oct. 6, 2015

(54) HIGH PRESSURE GAS TO LIQUID PROCESS

(75) Inventor: James Banister, Aberdeen (GB)

(73) Assignee: GAS2 LIMITED, Aberdeen (GB)

( * ) Notice: Subject to any disclaimer, the term of this patent is extended or adjusted under 35 U.S.C. 154(b) by 0 days.

(21) Appl. No.: 14/009,142

(22) PCT Filed: Mar. 30, 2012

(86) PCT No.: PCT/GB2012/050716
§ 371 (c)(1),
(2), (4) Date: Dec. 18, 2013

(87) PCT Pub. No.: WO2012/131385
PCT Pub. Date: Oct. 4, 2012

(65) Prior Publication Data
US 2014/0107233 A1      Apr. 17, 2014

(30) Foreign Application Priority Data
Apr. 1, 2011    (GB) .................................. 1105571.2

(51) Int. Cl.
*C10G 2/00*      (2006.01)
*B01J 12/00*     (2006.01)
(Continued)

(52) U.S. Cl.
CPC .............. *C10G 2/32* (2013.01); *B01J 12/007* (2013.01); *B01J 19/249* (2013.01); *B01J 19/2475* (2013.01); *B01J 19/2485* (2013.01); *C01B 3/386* (2013.01); *B01J 2219/00078* (2013.01);
(Continued)

(58) Field of Classification Search
CPC .. B01J 12/007; B01J 19/2475; B01J 19/2485; B01J 19/249; B01J 2219/00078; B01J 2219/2408; B01J 2219/2411; B01J 2219/2423; B01J 2219/2428; B01J 2219/2438; B01J 2219/2453; B01J 2219/59; B01J 2219/2462; B01J 2219/2475; B01J 2219/2479; B01J 2219/2485; B01J 2219/2487; B01J 8/009; C01B 2203/0261; C01B 2203/04; C01B 2203/0495; C01B 2203/062; C01B 2203/1035; C01B 2203/1064; C01B 2203/1241; C01B 2203/127; C01B 3/36; C01B 3/386; C10G 2300/1025; C10G 2400/02; C10G 2400/04; C10G 2/32
See application file for complete search history.

(56) References Cited

U.S. PATENT DOCUMENTS 6,344,491 B1     2/2002   Beer et al.
2005/0032921 A1  2/2005   Itenberg et al.
(Continued)

FOREIGN PATENT DOCUMENTS

| GB | 2403481 A | 1/2005 |
| WO | 2004/002927 A1 | 1/2004 |
| WO | 2004/098750 A1 | 11/2004 |

OTHER PUBLICATIONS

Guettel, R. et al, Fischer-Tropsch Synthesis: A Simulation Study, Chemical Engineering Science, 64, 2009, pp. 955-964.

*Primary Examiner* — Jafar Parsa
*Assistant Examiner* — Amy C Bonaparte
(74) *Attorney, Agent, or Firm* — E. Eric Mills; Nexsen Pruet, PLLC (57) ABSTRACT

There is herein described a high pressure gas to liquid (GTL) process. More particularly, there is described a once through high pressure GTL process utilizing a porous catalytic membrane reactor capable of being connected to a novel structured fixed bed reactor that incorporates forced flow through the porous catalytic structured catalyst in combination with high levels of heat transfer where there is no compression of syngas between reforming and Fischer-Tropsch steps.

20 Claims, 4 Drawing Sheets

(51) Int. Cl.
 B01J 19/24 (2006.01)
 C01B 3/38 (2006.01)
(52) U.S. Cl.
 CPC ... *B01J2219/2408* (2013.01); *B01J 2219/2411* (2013.01); *B01J 2219/2423* (2013.01); *B01J 2219/2428* (2013.01); *B01J 2219/2438* (2013.01); *B01J 2219/2453* (2013.01); *B01J 2219/2459* (2013.01); *B01J 2219/2462* (2013.01); *B01J 2219/2475* (2013.01); *B01J 2219/2479* (2013.01); *B01J 2219/2485* (2013.01); *B01J 2219/2487* (2013.01); *C01B 2203/0261* (2013.01); *C01B 2203/04* (2013.01); *C01B 2203/0495* (2013.01); *C01B 2203/062* (2013.01); *C01B 2203/1035* (2013.01); *C01B 2203/1064* (2013.01); *C01B 2203/127* (2013.01); *C01B 2203/1241* (2013.01); *C10G 2300/1025* (2013.01); *C10G 2400/02* (2013.01); *C10G 2400/04* (2013.01)

(56) References Cited

U.S. PATENT DOCUMENTS

| | | |
|---|---|---|
| 2007/0299147 A1 | 12/2007 | Gimpel et al. |
| 2009/0145589 A1 | 6/2009 | Filippi et al. |
| 2009/0286890 A1 | 11/2009 | Joshi et al. |
| 2013/0015405 A1* | 1/2013 | Quintero et al. ............ 252/373 |

* cited by examiner

HIGH PRESSURE GAS TO LIQUID PROCESS

REFERENCE TO RELATED APPLICATIONS

This application is a 35 U.S.C §371 U.S. national phase entry or International Application No. PCT/GB2012/050716 having an international filing date of Mar. 30, 2012, which claims the benefit of GB Application No. 1105571.2, filed Apr. 1, 2011, the entire disclosures of which are each incorporated by reference herein in there entireties.

FIELD OF THE INVENTION

The present invention relates to a high pressure gas to liquid (GTL) process. More particularly, the present invention relates to a once through high pressure GTL process utilising a porous catalytic membrane reactor capable of being connected to a novel structured fixed bed reactor that incorporates forced flow through the small pore Fischer-Tropsch catalyst in combination with high levels of heat transfer where there is no compression of syngas between reforming and Fischer-Tropsch steps.

BACKGROUND OF THE INVENTION

Gas to liquids processes that combine a reforming technology for production of synthesis gas with a Fischer-Tropsch process are well known. A variety of reforming technologies and Fischer-Tropsch reactor technologies are available and have differing efficiencies, complexities, scalabilities and costs. Three main technologies for the reforming of the synthesis gas are known and they are steam reforming, auto-thermal reforming and catalytic partial oxidation. For the largest scale processes the reforming technology of choice is usually auto thermal reforming as this produces the highest levels of thermal efficiency, operates with the lowest amount of steam and is the most straightforward for building in high capacity single trains for large world scale plants. This is typically combined with a slurry phase Fischer-Tropsch process utilising a cobalt catalyst. The description of the development of these technologies is well documented in texts such as A. P. Steynberg and M. E Dry, Fischer-Tropsch Technology, v 152, Studies in Surface Science and Catalysis, which is incorporated herein by reference.

While the drivers for world scale plants is to achieve competitive pricing through the construction of ever larger plants; the high levels of capital investment that are required for such large plants predicates that the plants must be built at large gas reserves capable of producing high rates of gas for many years: fields larger than 1 TcF.

However, much of the world's gas resources are contained within smaller widely separated fields where there is insufficient gas to provide a return on a large scale costly plant. In these circumstances the challenge is to produce a reduced cost plant that is optimised for manufacturing on a small scale with the minimum number of process units.

The concept of a simplified gas to liquids process has been discussed in a series of papers including "A new concept for the production of liquid hydrocarbons from natural gas in remote areas" by K Hedden, A. Jess and T Kuntze, Oil Gas— European Magazine 1994, which is incorporated herein by reference. Auto thermal reactors typically have used a burner wherein the light hydrocarbon stream is partially combusted with air or oxygen enriched air in combination with steam, whereby the thermal energy generated in the combustion produced a high temperature gas that is subsequently passed across a reforming catalyst within the same pressure vessel. This technology requires steam to be present that prevents the formation of soot and reduces catalyst deactivation. An alternate proposal seen in U.S. Pat. No. 6,344,491 is that the steam can be reduced or eliminated through carrying out the partial combustion step catalytically in a high velocity partial oxidation reactor. U.S. Pat. No. 6,344,491 is incorporated herein by reference. While the high velocity reactor can serve to reduce the size of the auto thermal reactor by no longer requiring an extended residence time for the combustion to complete and further reduces or eliminates the use of steam, it requires careful control to reduce the risk of an uncontrolled combustion. In a conventional auto thermal reforming the oxidant and hydrocarbon react as they mix, which allows for a safer reactor and allows higher levels of gas-preheating, however with catalytic partial combustion auto thermal reforming the safety of the system relies on the maintenance of high velocities within the reactor. Furthermore, with fixed bed pre-mixed partial oxidation it is found that catalyst overheating occurs such that the catalyst surface exceeds the temperature of the surrounding gas leading to increased catalyst deactivation. In addition temperatures within an air fed auto thermal or partial oxidation reactor that significantly exceed 1000° C. can lead to formation of nitrogen oxides that must be removed before a Fischer-Tropsch reactor so as to avoid catalyst poisoning.

A method of reforming methane for the production of synthesis gas is described in WO 2004/098750 and this syngas is described as suitable for conversion to Fischer-Tropsch products the patent does not offer a solution as to which process is most suitable for the production of the Fischer Tropsch products.

The use of fine particles or Fischer-Tropsch Catalyst to achieve high catalyst activity has been described such as in GB 2403481 utilising particles that range from 10 to 700 micron to achieve high catalyst activity, however these must be used within a liquid suspension to achieve efficient contact with the syngas and avoid excessive pressure drop. It is noted in this patent that the catalyst is ultimately removed through the use of porous filters but no reaction takes place on the filters in the absence of the syngas.

The presence of steam within the process gas which is utilised in conventional auto thermal reforming is detrimental to the simplification of the process that is desired for small scale production. The steam increases the thermal energy contained within the process gas that must be recovered to maintain the thermal efficiency. This results in a heat recovery system that is integral to maintaining thermal efficiency. However, the necessity to recover the heat increases the complexity, size and capital cost of the plant employed.

The challenge of building large Fischer-Tropsch reactors is well described by A. P. Steynberg and M. E Dry, Fischer-Tropsch Technology, v 152, Studies in Surface Science and Catalysis. For the largest scales the difficulties of producing tube sheets with diameters of several meters impacts on the cost and so part of the benefit for slurry bed technology comes from the ease of fabrication of the largest reactors. At the smaller levels of production the reactor complexity can be increased are relatively little incremental cost as the fabrication challenges are lower.

The challenges of heat transfer, mass transfer and volumetric efficiency for the Fischer-Tropsch reactor design is well described in the paper R. Guettel, T. Turek, Comparison of Different Reactor Types for Low Temperature Fischer-Tropsch Synthesis: A Simulation Study, Chemical Engineering Science, 64, (2009), 955-964, which illustrates the advantages and potential of the various technologies that are available for hydrocarbon liquid synthesis. While it is relatively straightforward to produce a cobalt catalyst for Fischer-Tropsch hydrocarbon production that can operate efficiently on the scale of a few grams of catalyst, this paper highlights the challenges of producing a reactor design capable of maintaining this performance at a commercial scale. Inherently a fixed bed of catalyst cannot operate with high cobalt efficiency unless particles of less than 200 microns are used. However, utilising small particles requires using low gas velocities if an excessive pressure drop is to be avoided. This results in poor heat transfer capabilities if the catalyst is simply packed within conventionally sized tubes of 25 mm diameter. The alternative would appear to be to coat the surface of a plate style reactor with particles of catalyst. While this solves the problem of the heat transfer and provides more heat transfer surface than is actually needed the construction methods of these types of reactor require that the process gas and catalyst occupies typically 40% or less of the total reactor volume. Taking into account the manifolding and any pressure containing shell that is required can result in a very low volumetric efficiency of catalyst packing and a high specific reactor capital cost. Some of this loss in efficiency can be recovered through operating the catalyst at higher temperature and with a higher inherent efficiency, but this can result in a reduced catalyst life and lower selectivities to desired hydrocarbon product.

One alternative proposed that allows a high activity bed to be developed is to use a structured catalyst such as described in Itenberg et al. US 2005/0032921 which utilises a high permeability cylindrical structure with a typical equivalent fixed bed depth of approximately 5 mm. US 2005/0032921 is incorporated herein by reference. The gas is forced through the porous structure which allows the catalyst to operate without severe mass transfer restrictions. The thermal conductivity of the fused catalyst structure is sufficient to avoid temperatures differentials of more than 5° C. building up across the membrane structure.

This goes some way to illustrate the method by which the cobalt structure can be incorporated within the reactor to maintain the cobalt catalyst efficiency but does not describe how the heat can best be removed from the reactor. It also restricts the catalyst formulation to one that can be fused to produce a support structure that is mechanically strong enough to be utilised within a commercial reactor. The problem of producing high mechanical strength catalysts that are capable of surviving either slurry phase attrition or the forces associated with the high pressure drops and packing stresses of a fixed bed process.

Another alternative is the use of slurry bed technology where the catalyst particle is suspended within liquid product mixture agitated by gas sparging which while delivering a reactor that has a higher volumetric loading of cobalt within the reactor and a high catalyst effectiveness through the use of small suspended particles suffers from the difficulties associated with catalyst attrition. The fine catalyst particles must be removed from the product solution utilising filtration, either internal or external to the reactor. These filters have a tendency to block as a result of the catalyst attrition inherent to the process.

What is needed is a reactor design that enables a high heat transfer solution to be placed within a Fischer-Tropsch reactor that enables a high catalyst efficiency to be maintained. It also requires a catalyst support structure that allows the formulations of cobalt catalyst that have high levels of reducibility and activity to be incorporated into the structure without the constraints of mechanical strength and thermal conductivity.

High heat transfer within a reactor can be achieved utilizing flat plate style of heat exchangers that do not encapsulate the catalyst for example US 2009/0145589A1 but this does not utilize a structured support for the catalyst to enable forced flow of reactant gas through the catalyst pore structure to enhance the catalyst activity.

Consequently there is a continuing search for a gas to liquids technology suitable for small scale operation that minimises capital cost through the use of technology requiring the minimal of integration, avoiding compression of the syngas between reformer and Fischer-Tropsch unit and providing a Fischer-Tropsch reactor capable of high conversion and operating with high catalyst activities.

It is an object of at least one aspect of the present invention to obviate or mitigate at least one or more of the aforementioned problems.

It is a further object of at least one aspect of the present invention to provide an improved Fischer-Tropsch process which avoids compression of syngas between reformer and a Fischer-Tropsch unit and provides a Fischer-Tropsch reactor capable of high conversion and operating with high catalyst activities.

SUMMARY OF THE INVENTION

According to a first aspect of the present invention there is provided a method for producing synthesis gas from a light hydrocarbon stream using an oxidant stream comprising oxygen as an oxidant in a catalytic partial oxidation reactor and converting the synthesis gas in a Fischer-Tropsch process using a supported cobalt catalyst to produce heavier paraffin's wherein the required process pressure is supplied by charging the reactant streams to the catalytic partial oxidation reactor, the method comprising:

a. compressing and heating the oxidant stream;

b. heating the light hydrocarbon stream;

c. supplying the oxidant and hydrocarbon streams to a catalytic partial oxidation reactor to form synthesis gas, the catalytic partial oxidation reactor comprising two chambers separated by a porous wall that is non-ion conducting, where the porous wall contains or supports a rhodium catalyst and the oxidant and hydrocarbon molar flows are in the ratio of approximately about 1:2 and the oxidant is introduced predominantly into one chamber and the hydrocarbon is introduced predominantly into the other chamber;

d. cooling the produced synthesis gas to condense water and separating the water;

e. passing the dried synthesis gas without further compression to the Fischer-Tropsch reactor;

f. converting the dried synthesis gas in a fixed bed, structured catalyst reactor with forced flow through the catalyst pore structure to produce a heavy hydrocarbon stream (e.g. heavy paraffin's) and a gaseous stream comprising light hydrocarbons, hydrogen, carbon monoxide, water using a catalyst supported in a fixed bed of particles of about 200 microns; and g. recovering a product stream comprising light and heavy hydrocarbons, hydrogen and carbon monoxide.

The present invention therefore relates to an improved Fischer-Tropsch process which avoids compression of syngas between reformer and a Fischer-Tropsch unit and provides a Fischer-Tropsch reactor capable of high conversion and operating with high catalyst activities.

The inputted light hydrocarbon stream used to form the synthesis gas may be selected form any of the following: Methane; natural gas; coal bed methane associated gas; tight gas and shale gas.

The produced heavy hydrocarbon stream may be selected form any of the following: LPGs; gasolines; diesels; soft waxes and hard waxes.

The oxidant stream may be compressed to values of 20 barg and heated to a range of 450 deg C.

Typically, the light hydrocarbon stream may be heated to 500 deg C.

The catalyst for the production of syngas may be rhodium on alumina held on a porous support.

The oxidant may be air or oxygen enriched air or pure oxygen.

The hydrogen:carbon monoxide ratio of the syngas produced may be from about 1.8:1 to 2.2:1.

The molar ratio of steam to light hydrocarbon fed to the catalytic partial oxidation reactor may be less than about 0.5:1.

The length of the chamber in the catalytic partial oxidation reactor to which the light hydrocarbon may be fed can be characterised by a Reynolds number greater than about 1000.

The length of the chamber in the catalytic partial oxidation reactor to which the light hydrocarbon is fed may be longer than about 1000 mm.

The catalyst for the production of hydrocarbons may be cobalt on alumina. The cobalt catalyst within the Fischer-Tropsch Reactor may be supported by a porous ceramic structure which, for example, may have a characteristic pore size greater than about 500 nm.

The cobalt catalyst held on a porous support within the Fischer-Tropsch Reactor may be characterised by having a hydraulic mean diameter within the catalyst bed of less than 1 mm.

Typically, about 90% of the cobalt present is held within about 8 mm of a heat transfer surface.

The overall permeability of the fixed bed of the Fischer-Tropsch may be more than about $1 \times 10^{-15}$ m.

Typically, the overall permeability of the fixed bed of the Fischer-Tropsch may be more than about $1 \times 10^{-16}$ m.

The structured fixed bed of Fischer-Tropsch catalyst may be arranged in a cylindrical form. In particular embodiments, the cylindrical form fixed bed of Fischer-Tropsch catalyst may be shaped such that the internal visible surface of the cross section fixed bed has a perimeter that is greater than the perimeter of the circle within which the outer surface can be inscribed.

The heat transfer surface may be extended by the use of longitudinal fins.

The heat may be removed from the reaction section of the reactor by the use of circulation of hydrocarbon product within the central structure formed by the cylindrical Fischer-Tropsch catalyst.

The fixed bed of the Fischer-Tropsch catalyst may be arranged in a planar form. In particular embodiments the planar catalyst support structure forms a chamber upon which the catalyst is coated and through which the syngas is forced to flow

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of a once through high pressure GTL process utilising a porous membrane reactor connected to a novel fixed bed reactor that incorporates forced flow through a small pore catalyst and high levels of heat transfer where there is no compression of syngas between reforming and Fischer-Tropsch steps.

The method of the present invention comprises:
a) Heating the light hydrocarbon to a temperature from about 300 to 400° C.
b) Passing the light hydrocarbon stream with added hydrogen to a desulphurisation zone and contacting the light hydrocarbon stream with a suitable catalyst to convert sulphur containing compounds contained in the light hydrocarbon stream into hydrogen sulphide.
c) Removing the hydrogen sulphide from the light hydrocarbon stream and further heating the light hydrocarbon stream to a temperature from about 250 to 550° C.
d) Charging the light hydrocarbon to a catalytic partial oxidation reactor at a pressure from about 10 to about 40 barg.
e) Compressing and heating the air or oxygen enriched gas to a temperature of about 250 to 550° C. and a pressure from about 10 to about 40 barg.
f) Feeding the air or oxygen enriched air and the light hydrocarbon to a two chamber reactor where the light hydrocarbon and oxygen containing stream are separated by a porous ceramic wall that supports or contains a catalyst partial oxidation catalyst such as rhodium deposited onto alumina where the mechanism of transport of the oxygen species from one side to the other is as the diatomic oxygen molecule and not substantially through incorporation of oxygen into the ionic lattice within the ceramic material.
g) Partially oxidising the light hydrocarbon to carbon oxide species comprising substantially carbon monoxide within the two chamber reactor to produce a synthesis gas at a temperature from about 500 to 1200° C. and a pressure from about 10 to 40 barg.
h) Cooling the synthesis gas to a temperature below about 70° C. and separating water from the synthesis gas to produce a dry synthesis gas.
i) Converting some of the dried synthesis gas in a fixed bed reactor into a paraffin product containing from about 5 to 30 carbon atoms using a supported cobalt containing catalyst which is supported on a structure that enables a substantial flow of the gas to be forced by differential pressure through the small pore structure of the catalyst where the catalyst is supported on a ceramic or metallic structure that is porous or perforated sufficiently to allow passage of the gas through the supporting structure which is in close proximity to a metallic heat transfer surface containing a utility fluid to remove the reaction heat from the reaction zone at a reactor temperature from about 200 to 240° C. and a reactor pressure from about 10 to 40 barg.
j) Removing the multi-phase product stream including unreacted gas from the reactor.
k) Cooling an separating the resultant stream by cooling and phase separation into the desired liquid hydrocarbon stream, produced water stream and light gases containing light hydrocarbon and unreacted gases.

Figure 1A:
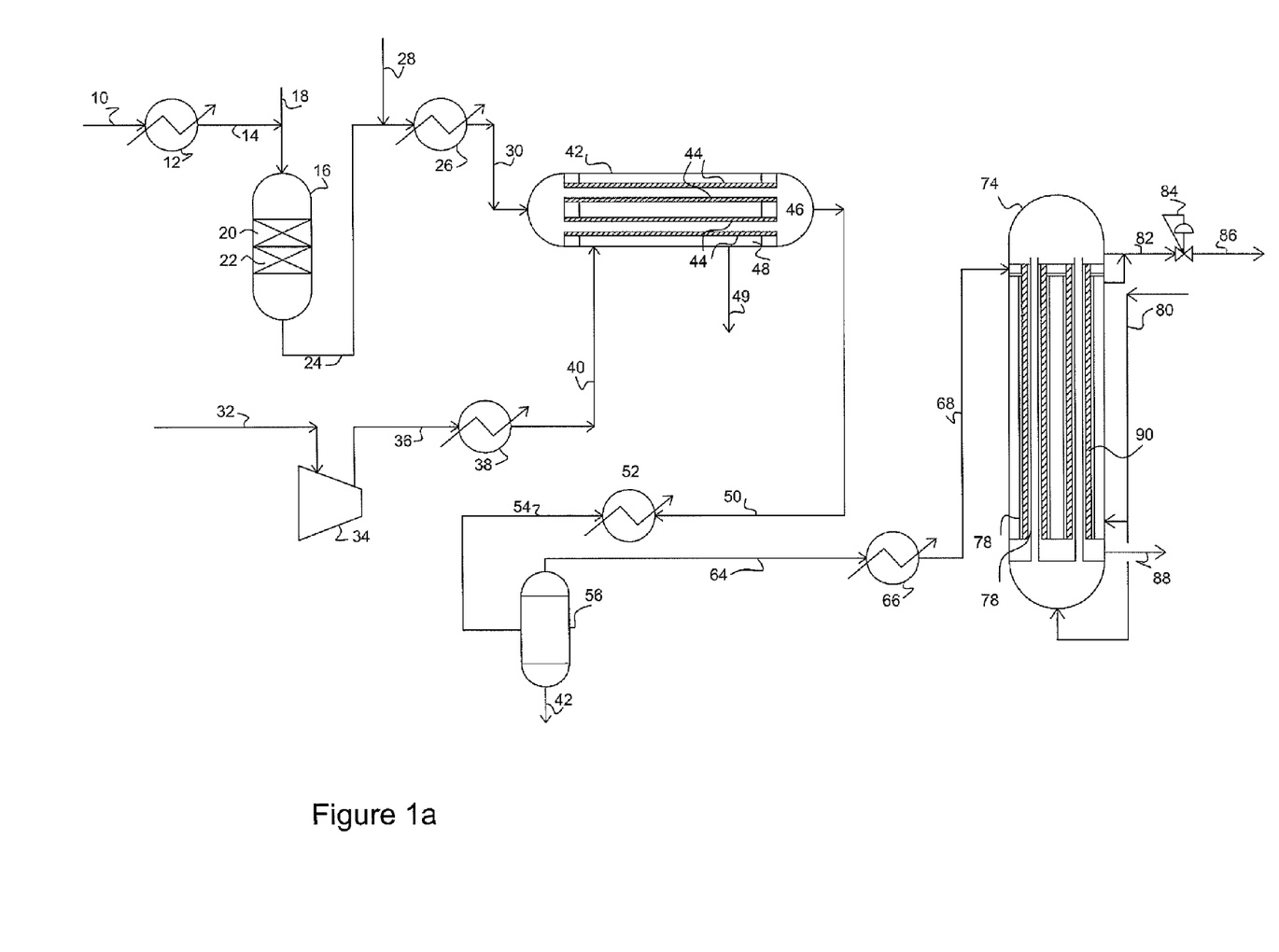
FIG. 1a is a schematic representation of a once through high pressure GTL apparatus comprising a reactor according to the present invention.

Turning to FIG. 1a there is shown a light hydrocarbon stream (e.g. methane( which is passed through line 10 to a heater 12 which heats the gas to a temperature from about 300 to 400° C.

The light hydrocarbon is then passed to a desulphurisation unit 16 via line 14. The unit 16 includes a catalyst bed 20 which is typically a cobalt/molybdenum catalyst supported on an inert carrier such as alumina. The unit 16 will also contain a hydrogen sulphide absorbent 22 such as zinc oxide.

Hydrogen is supplied to the desulphurisation unit 16 as required by line 18. Typically 1 volume percent or less of hydrogen is supplied to the desulphurisation unit 16.

The desulphurised stream is then passed through a line 24 to a second heater 26 where it is heated to a temperature from about 250 to 550° C. and passed through a line 30 to a two chamber partial oxidation reactor 42.
An air stream or an oxygen enriched air stream, is passed through a line 32 to a compressor 34 and compressed to a pressure from about 10 barg to 40 barg. The oxidant is then passed through a line 36 to a heater 38 where it is heated to a temperature of about 250 to 550° C. and then passes through a line 40 to the catalytic partial oxidation reactor 42.

Steam may be mixed with the methane via a line 28. In the embodiment shown in FIG. 1a steam is added in an amount from about 0.01 to 0.2 volumes of steam per volume of methane.

The air and then natural gas are then fed to separate chambers of the catalytic partial oxidation reactor 42 which contains a porous ceramic structure 44 that separates the chamber where the methane is introduced from the chamber where the oxidant is introduced. The ceramic structure 44 supports the rhodium on alumina catalyst that may be supported on the surface of the ceramic structure or are located within the pores of the structure. The ceramic may be a predominantly alumina material or other such material that is chosen to be stable within reducing and oxidising high temperature environments and has a porosity from about 10% to about 50% and has a pore size that is from about 200 nm to about 20,000 nm and is typically from about 1 mm thick to about 10 mm thick.

The rhodium on alumina catalyst may typically be from about 1 wt % to 20 wt % rhodium supported on a thermally stabilised alumina with a high surface area such as a gamma alumina or other similar morphology alumina.

The oxidant passes through the porous ceramic structure 44 and meets with the methane that diffuses into the ceramic structure 44 against the flow of oxidant and reacts at the catalyst with the oxidant to produce a gaseous stream comprising carbon monoxide, carbon dioxide, hydrogen, water and nitrogen.

The ceramic barrier 44 is arranged as a cylindrical structure within areactor housing such that the methane gas and product synthesis gas flow is turbulent, typically with a Reynolds number greater than about 2000 at the methane inlet point. This can be achieved the use of a cylindrical membrane that is typically more than about 1000 mm in length with an external diameter of ceramic of more than about 25 mm and a hydraulic mean diameter of channel along the ceramic of more than about 5 mm.

The temperature in the reactor is maintained at a temperature from about 750 to 1200° C. The catalyst surface temperature is maintained at moderate temperature by the turbulence of the gases adjacent to the ceramic structure.

The gas mixture discharges from the reactor predominantly from the chamber 46 at a pressure from about 10 barg to about 40 barg and a temperature from about 750 to 1100° C. Some product, line 49, may also be drawn from chamber 48. Typically, carbon conversion greater than about 85 percent can be achieved in such partial oxidation reactors at these reaction conditions. The synthesis gas typically contains hydrogen and carbon monoxide ratios from about 3:1 to about 1.5:1. For the production of heavy paraffin's a ratio of about 2.1:1 is preferred.

The synthesis gas stream in line 50 is passed to a heat exchanger 52 where it is cooled to about 70° C. at about 10 barg to about 40 barg and passed via a line 54 to a water separator 56 where water is separated and discarded via a line 58 or re-cycled to the process.

The synthesis is gas passed via line 64 to a heater 66 where it is preheated to a temperature of about 220° C. at about 10 to 40 barg and passed via a line 68 to a Fischer-Tropsch Reactor 74.

The reduction in the peak temperatures encountered within the partial oxidation reactor reduces the extent to which molecular nitrogen reacts to form more chemically active molecules such as ammonia. It may be desirable to insert before the Fischer-Tropsch Reactor 74 a device for removing traces of chemically active nitrogen molecules such as ammonia as a means to reduce the impact of these species on the activity of the Fischer-Tropsch catalyst. Gas treatments such as water scrubbing or the addition of water to the de-mister section of the separator 56 are well known to those skilled in the art. Furthermore, the separator 56 may be replaced with a two or three stage cooling and phase separation section to maximise temperature of the utility fluid into which the thermal energy is recovered.

In the embodiment shown the methane gas is available at a sufficient pressure so that only the air requires compression. The pressure losses across the catalytic partial oxidation reactor and subsequent gas treatment sections are sufficiently small such the no further compression of gas between the catalytic partial oxidation reactor and the Fischer-Tropsch reactor are required.

The Fischer-Tropsch reactor 74 contains heat transfer tubes 78 which are fed with water via line 80 with steam recovered through a line 82. The pressure on heat exchange tubes 78 is controlled by a back pressure valve 84 in line 82, so that the temperature in the reactor 74 can be controlled.

Figure 2A:
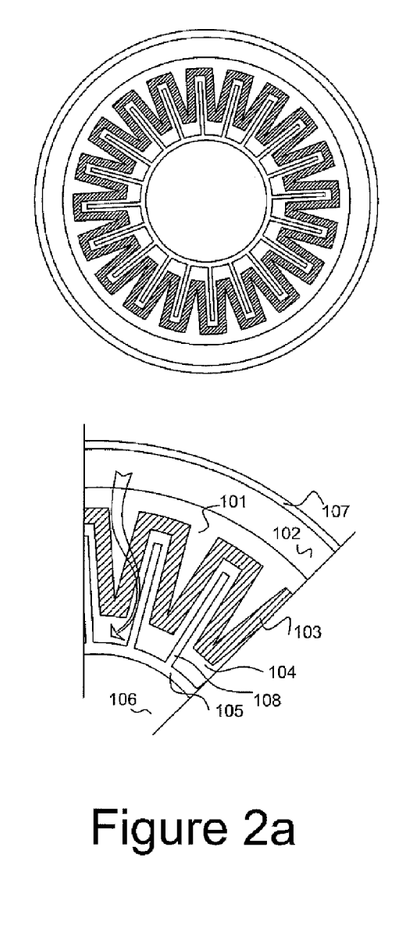
FIGS. 2a-2e are representations of further reactors and cross-sections of these reactors according to further embodiments of the present invention.

The fixed bed of catalyst, 90 within the reactor 74 is shown in more detailed cross section in one embodiment in FIG. 2a and comprises porous tubes, 201 on which a layer of catalyst particles, are deposited. The catalyst particles are typically about 200 microns in diameter and form a bed of catalyst, 103 that is typically about 1 mm deep. The support for the catalyst is shaped in a form such as a star shape as shown in FIG. 2a such that, examining the cross-section of the bed, the internal surfaces of the bed is greater than the perimeter of the circle within which it can be inscribed. The small bed depth and folding of the bed allows use of a low permeability catalyst bed, typically less than $5 \times 10^{\wedge}(-15)$ m, while allowing a high volumetric concentration of catalyst and formation of a large surface area to be presented to a heat transfer surface or fluid. The supported catalyst is held in close proximity to a heat transfer tube, 105, typically within about 5 mm and may be operated with substantial parts of the catalyst in thermal contact with the heat transfer section. The tube 105 is shown with a finned structure, 108, to extend the heat transfer surface area and improve thermal contact with the catalyst.

In operation the synthesis gas mixture is introduced into void space 102 bounded by the external heat transfer surface 107 which may form a pressure shell. The gases pass through the porous structure 101, which typically has pores in excess of about 1000 nm to the catalyst bed 103 where the pore structure is significantly smaller. The movement of the gas through the catalyst bed 103 enables a high catalyst effectiveness to be maintained. The product and gases are then collected in chamber 104. Within chamber 106 there is a heat transfer mechanism that maintains the wall 105 at the desired reaction temperature. Such mechanisms for control of the heat transfer surface include the boiling of water, the circulation of a hydrocarbon or the use of specialist heat transfer fluid.

Figure 2B:
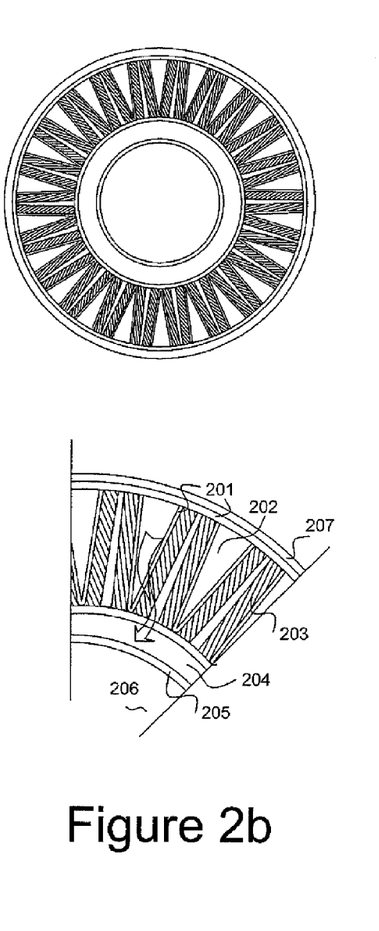

A second embodiment of the fixed bed of catalyst, also utilising forced flow through the catalyst pore structure in shown in FIG. 2b. In this arrangement the support of the catalyst, 201 is a porous metallic, thermally conducting structure which is in thermal contact with the heat transfer surface 207. The synthesis gas is introduced into chamber 202 and then forced by pressure through the catalyst bed 203 and porous or perforated metallic wall 201, collecting in chamber 204. A further heat transfer surface is provided, 205, within which heat transfer fluid 206 is circulating. A variation of this embodiment would be to operate in the absence of the heat transfer surface 107. This would have the benefit of making the reactor more compact, but reduces the heat transfer effectiveness of the reactor design.

Figure 2C:
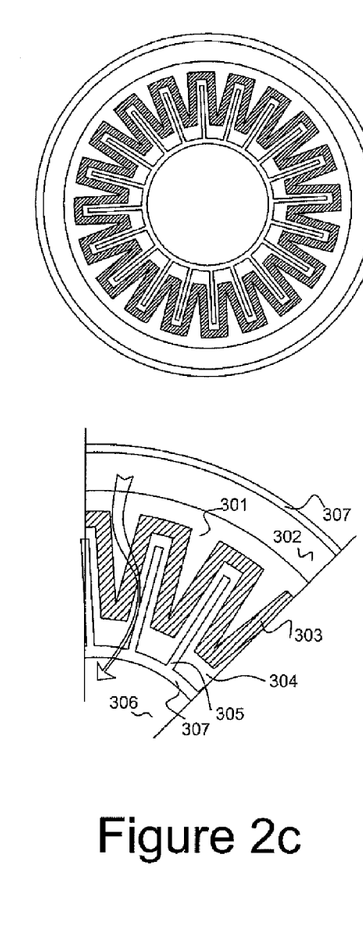

A third embodiment shown in FIG. 2c is a variation of the embodiment FIG. 2a. In this embodiment the wall 307 is porous or perforated allowing gas and liquid product to collect in chamber 306. The passage of gas into the chamber 306 agitates the liquid enhancing heat transfer and maintaining the even temperature of the surface 305. Furthermore, the gas fraction within the chamber 306 may be sufficient to lower the overall bulk density of the fluid such that recirculation of the hydrocarbon fluid may occur, either within the reactor or with an external loop in a similar manner to a thermosyphon mechanism of a heat exchanger of a boiler where the reduced overall density of liquid due to the presence of vapour spaces causes the fluid to be displace by cooler liquid continuous fluid. External cooling of the fluid could similarly be performed without the use of an external pump.

Figure 2D:
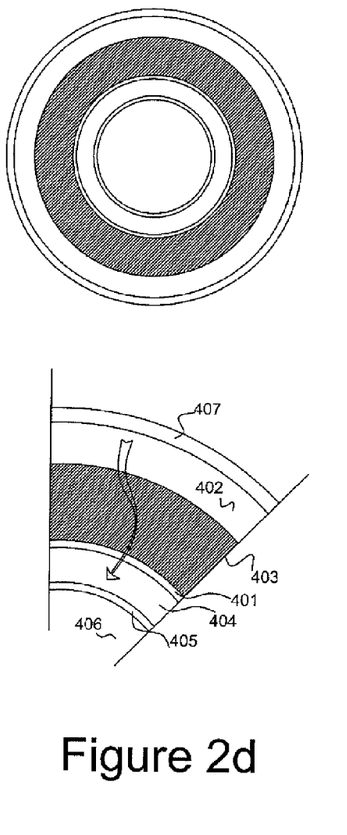

A fourth embodiment is shown in FIG. 2d in which a high permeability fixed bed of catalyst 403 is supported on a mechanically strong porous support, ceramic or metal 401. The synthesis gas passes from the external chamber 402 to the internal chamber 404. In this embodiment a heat transfer surface 405 and 407 is provided both internal and external to the fixed bed.

Figure 2E:
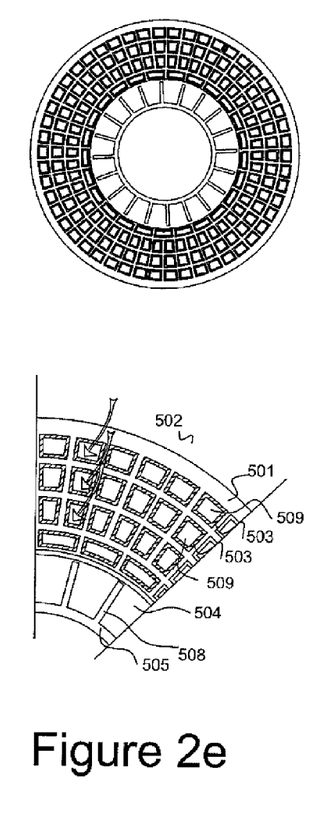

A fifth embodiment is shown in FIG. 2e in which a high permeability monolith ceramic 501 containing channels 509 coated with a fixed bed of catalyst 503 is arranged such that the synthesis gas passes from the external chamber 502 through the ceramic 501 and through the catalyst bed 503 into the channels 509. While the channels may have a high hydraulic mean diameter in excess of 1 mm the actual fixed bed of catalyst has a hydraulic mean diameter that is in the region of 10 microns. The gas and products then pass substantially down the channels 503 as well as through the ceramic structure. Within the monolith is a larger central channel 504 in which is located a heat transfer surface 505, that may be additionally have fins 508 forming an extended surface. Syngas, product hydrocarbons and compatible heat transfer media may additionally flow through the chamber 504.

Figure 2F:
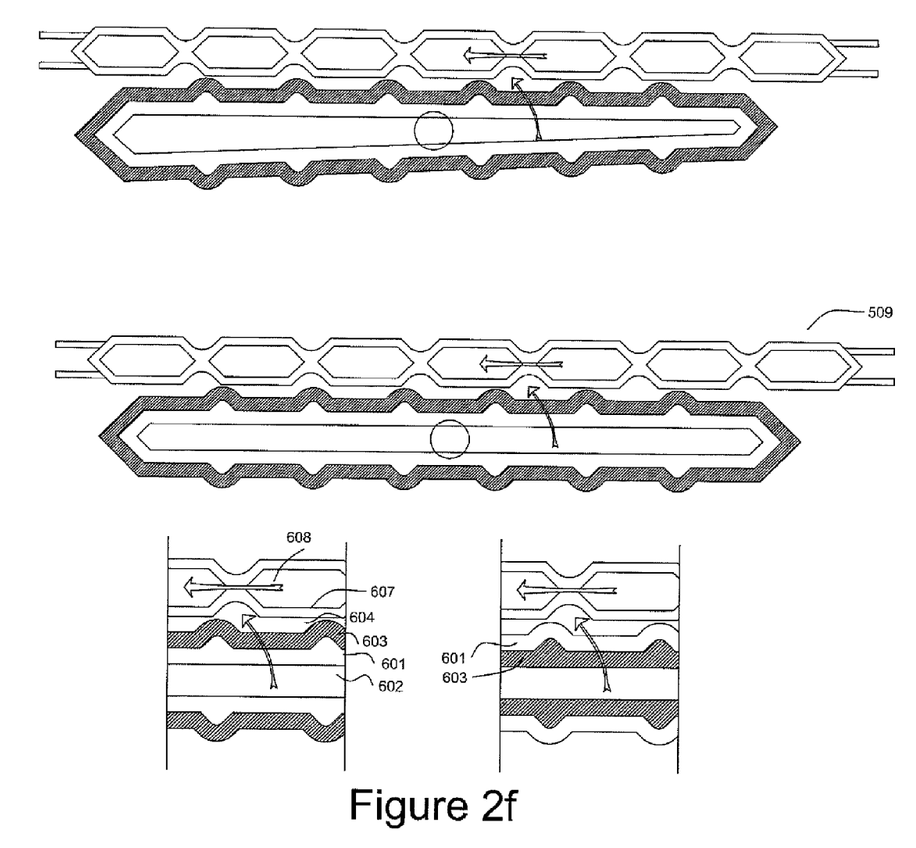
FIG. 2f represents a further coolant structure according to a further embodiment of the present invention.

A sixth embodiment is shown in FIG. 2f in which a high permeability fixed bed of catalyst 603 is supported on or in a substantially planar porous support ceramic or metal 601. The synthesis gas passes from the internal chamber 601 through the porous support 601 and catalyst bed 603 to the outer chamber 604. Cooling is provided at the surface 607 which contains the coolant flow 608. Such a coolant structure 609 could be formed through explosive forming, diffusion bonding, edge welding, spot welding or other technique familiar to the heat exchanger engineer.

A two phase product stream, 88, comprising water, synthesis gas, light hydrocarbons, paraffin's and nitrogen is recovered from the reactor, from where is to fed to a product isolation section. Typically stream 88 will be recovered at from about 200 to 240° C. and at a pressure from about 17 to 23 barg. This stream will be roughly up to 2 barg below the pressure of the synthesis gas charged to the Fischer-Tropsch reactor as a result of pressure losses from the forced flow of the gas through the porous catalytic structure. This stream will typically then be passed through coolers and two or three phase separators in order to remove much of the water and heavier hydrocarbons. The remainder gas which contains unreacted synthesis gas would be at sufficient pressure for use in further Fischer-Tropsch Reactors.

Where the pressure of the hydrocarbon feed is not sufficient for successful operation of the Fischer-Tropsch section of the process it may be necessary to compress the hydrocarbon stream prior to introduction into the partial oxidation reactor.

According to the present invention a method has been provided for economically and efficiently providing a high pressure synthesis gas stream for use in a Fischer-Tropsch reactor that is most suitable for the use in small scale Gas to Liquids, whereby the simple nature of the process, the near absence of steam, the elimination of synthesis gas compression, the high volumetric catalyst loading in the Fischer-Tropsch Reactor and the forced flow through the pore structure of the Fischer-Tropsch Catalyst produce a process that is overall compact, reduced cost and thermally more efficient than other technology combinations.

Whilst specific embodiments of the present invention have been described above, it will be appreciated that departures from the described embodiments may still fall within the scope of the present invention. For example, any suitable type of catalyst and reactor may be used.

The Invention claimed is:

1. A method for producing a heavier hydrocarbon stream from a light hydrocarbon stream using an oxidant stream comprising oxygen as an oxidant in a catalytic partial oxidation reactor to form a synthesis gas and converting the synthesis gas in a Fischer-Tropsch process using a Fischer-Tropsch reactor and supported catalyst to produce heavier paraffins, the method comprising:

a. compressing and heating the oxidant stream;
  b. heating the light hydrocarbon stream;
  c. supplying the oxidant and hydrocarbon streams to a catalytic partial oxidation reactor to form the synthesis gas, the catalytic partial oxidation reactor comprising two chambers separated by a porous ceramic wall, where the porous ceramic wall contains or supports a partial oxidation rhodium on alumina catalyst and wherein the porous ceramic wall is a cylindrical structure which has a porosity from 10% to 50% and has a pore size that is from 200 nm to 20,000 nm and is from 1 mm to 10 mm thick, and the oxidant and hydrocarbon molar flows are in the ratio of approximately about 1:2 and the oxidant is introduced predominantly into one chamber and the hydrocarbon is introduced predominantly into the second chamber;
  d. cooling the produced synthesis gas to condense water and separating the water;
  e. passing the dried synthesis gas without further compression to the Fischer-Tropsch reactor;

f. converting the dried synthesis gas in a fixed bed, structured catalyst reactor where catalyst particles are fixed on a porous support and there is forced flow of the dried synthesis gas through the supported catalyst and porous support to produce a hydrocarbon stream and a gaseous stream comprising light hydrocarbons, hydrogen, carbon monoxide, water; and g. recovering a product stream comprising light and heavy hydrocarbons, hydrogen and carbon monoxide.

2. A method for producing a heavier hydrocarbon stream according to claim 1, wherein the inputted light hydrocarbon stream used to form the synthesis gas is selected from any of the following: methane; natural gas; coal bed methane; associated gas; tight gas and shale gas; and wherein the porous wall containing or supporting the partial oxidation catalyst is non-ion conducting.

3. A method for producing a heavier hydrocarbon stream according to claim 1, wherein the produced heavy hydrocarbon stream is selected form any of the following: LPGs; gasolines; diesels; soft waxes and hard waxes; and the oxidant stream is compressed to values from 10 to 30 barg and heated to a range of 250 to 450 deg C.; and the light hydrocarbon stream is heated to from 250 deg C. to 550 deg C.

4. A method for producing a heavier hydrocarbon stream according to claim 1, wherein the partial oxidation catalyst comprises rhodium deposited on a high surface area support; the high surface area support for the rhodium based catalyst is a thermally stabilised high surface area alumina; or the Fischer-Tropsch catalyst is a cobalt based catalyst.

5. A method for producing a heavier hydrocarbon stream according to claim 1, wherein the oxidant is air or oxygen enriched air; the oxidant contains more than 19% but less than 97% oxygen; and wherein the produced synthesis gas comprises a hydrogen:carbon monoxide ratio from about 1.8:1 to 2.2:1.

6. A method for producing a heavier hydrocarbon stream according to claim 1, wherein a molar ratio of steam to light hydrocarbon fed to the catalytic partial oxidation reactor is less than about 0.5:1; or the length of the chamber in the catalytic partial oxidation reactor to which the light hydrocarbon is fed is longer than about 1000 mm.

7. A method for producing a heavier hydrocarbon stream according to claim 1, wherein the length of the chamber in the catalytic partial oxidation reactor to which the light hydrocarbon is fed is longer than about 3000 mm; or the Fischer-Tropsch catalyst within the Fischer-Tropsch reactor is supported by a porous structure which has a characteristic pore size greater than about 500 nm.

8. A method for producing a heavier hydrocarbon stream according to claim 1, wherein the Fischer-Tropsch catalyst within the Fischer-Tropsch reactor is supported by a porous structure which has a characteristic pore size greater than about 3000 nm; or wherein the fixed bed of catalyst held on a porous support within the Fischer-Tropsch reactor has a characteristic hydraulic mean diameter of less than 1 mm.

9. A method for producing a heavier hydrocarbon stream according to claim 1, wherein the Fischer Tropsch catalyst adhered to the porous support through which the synthesis gas passes comprises a layer that is more than 200 micron thick.

10. A method for producing a heavier hydrocarbon stream gas according to claim 1, wherein the Fischer-Tropsch catalyst is a cobalt based catalyst comprising cobalt and about 90% of the cobalt present is held within about 8 mm of a heat transfer surface; and wherein the overall permeability of the fixed bed of the Fischer-Tropsch reactor is more than about $1 \times 10^{-15}$ m.

11. A method for producing a heavier hydrocarbon stream according to claim 1, wherein the overall permeability of the fixed bed of the Fischer-Tropsch reactor is more than $1 \times 10^{-16}$ m; and wherein the porous support of the Fischer-Tropsch catalyst is arranged in a cylindrical form to form an outer and inner chamber.

12. A method for producing a heavier hydrocarbon stream according to claim 1, wherein the porous support of the Fischer-Tropsch catalyst forms separate chambers through which synthesis gas is forced to flow; and wherein a perimeter of a cylindrical form of the fixed bed of Fischer-Tropsch catalyst is folded such that the internal visible surface of the cross section fixed bed has a perimeter that is greater than the perimeter of the circle within which the outer surface can be inscribed.

13. A method for producing a heavier hydrocarbon stream according to claim 1, wherein a cylindrical form of the fixed bed of Fischer-Tropsch catalyst contains internal channels such that the internal visible surface of the cross section fixed bed has a perimeter that is greater than the perimeter of the circle within which the outer surface can be inscribed.

14. A method for producing a heavier hydrocarbon stream according to claim 1, wherein a heat transfer surface has been extended by the use of longitudinal fins; and where the porous catalyst support for Fischer Tropsch catalyst is essentially in a planar form.

15. A method for producing a heavier hydrocarbon stream according to claim 1, wherein hydrocarbon product is circulated within chambers formed by the Fischer-Tropsch catalyst.

16. A method for producing a heavier hydrocarbon stream according to claim 1, wherein a molar ratio of steam to light hydrocarbon fed to the catalytic partial oxidation reactor is less than about 0.5:1; or the length of the chamber in the catalytic partial oxidation reactor to which the light hydrocarbon is fed is longer than about 2000 mm.

17. A method for producing a heavier hydrocarbon stream according to claim 1, wherein the length of the chamber in the catalytic partial oxidation reactor to which the light hydrocarbon is fed is longer than about 3000 mm; or the Fischer-Tropsch catalyst within the Fischer-Tropsch reactor is supported by a porous structure which has a characteristic pore size greater than about 1000 nm.

18. A method for producing a heavier hydrocarbon stream according to claim 1, wherein the Fischer-Tropsch catalyst within the Fischer-Tropsch reactor is supported by a porous structure which has a characteristic pore size greater than about 10,000 nm; or wherein the fixed bed of catalyst held on a porous support within the Fischer-Tropsch reactor has a characteristic hydraulic mean diameter of less than 1 mm.

19. A method for producing a heavier hydrocarbon stream according to claim 1, wherein the Fischer Tropsch catalyst adhered to the porous support through which the synthesis gas passes comprises a layer that is more than 500 micron thick.

20. A method for producing a heavier hydrocarbon stream according to claim 1, wherein the Fischer Tropsch catalyst adhered to the porous support through which the synthesis gas passes comprises a layer that is more than 1000 micron thick.

* * * * *